United States Patent [19]

Layne

[11] Patent Number: 5,497,874
[45] Date of Patent: Mar. 12, 1996

[54] ARTICLE ENGAGING INSERT FOR MODULAR LINK CONVEYOR

[75] Inventor: James L. Layne, Scottsville, Ky.

[73] Assignee: Span Tech Corporation, Glasgow, Ky.

[21] Appl. No.: 262,415

[22] Filed: Jun. 20, 1994

[51] Int. Cl.⁶ ................................................. B65G 15/44
[52] U.S. Cl. ..................................... 198/698; 198/803.01
[58] Field of Search .......................... 198/803.21, 698, 198/699.1, 688.1, 850, 851, 853

[56] References Cited

U.S. PATENT DOCUMENTS

| 902,524 | 10/1908 | Eklund | 198/698 |
|---|---|---|---|
| 1,124,168 | 1/1915 | Pope | 198/698 X |
| 1,597,239 | 8/1926 | Manierre | 198/698 X |
| 1,865,879 | 7/1932 | Newhouse | 198/698 |
| 2,466,240 | 4/1949 | Joa | 198/698 X |
| 2,796,972 | 6/1957 | Jeffras, Sr. | 198/698 |
| 3,602,364 | 8/1971 | Maglio et al. . | |
| 4,567,077 | 1/1986 | Gauthier . | |
| 4,582,193 | 4/1986 | Larsson | 198/803.01 |
| 4,611,710 | 9/1986 | Mitsufuji | 198/803.01 |
| 4,629,063 | 12/1986 | Hodlewsky et al. . | |
| 4,925,013 | 5/1990 | Lapeyre | 198/698 |
| 4,953,693 | 9/1990 | Draebel . | |
| 5,000,311 | 3/1991 | Abbestam et al. | 198/803.01 |
| 5,224,583 | 7/1993 | Palmaer et al. . | |
| 5,253,749 | 10/1993 | Ensch . | |
| 5,323,893 | 6/1994 | Garbagnati | 198/803.01 X |

Primary Examiner—D. Glenn Dayoan
Attorney, Agent, or Firm—King and Schickli

[57] ABSTRACT

A modular link conveyor including a series of article engaging inserts includes a plurality of downwardly extending projections on each insert is provided to engage a series of corresponding apertures across the width of the modular links. A series of transversely mounted retaining rods secure the article engaging inserts to the conveyor. In the preferred embodiment, each insert is provided with one or more elastomer pads across the top surface of the insert for positive frictional engagement of the article being transported on the conveyor along the path. In the first alternative embodiment, each insert is provided with transversely mounted pusher bar, including an upstanding projection, to positively feed articles when necessary, such as when going up an incline. In a second alternative embodiment, each article engaging insert is provided with a transversely mounted bar having an obliquely angled face, similarly capable of positively feeding articles on the conveyor.

21 Claims, 2 Drawing Sheets

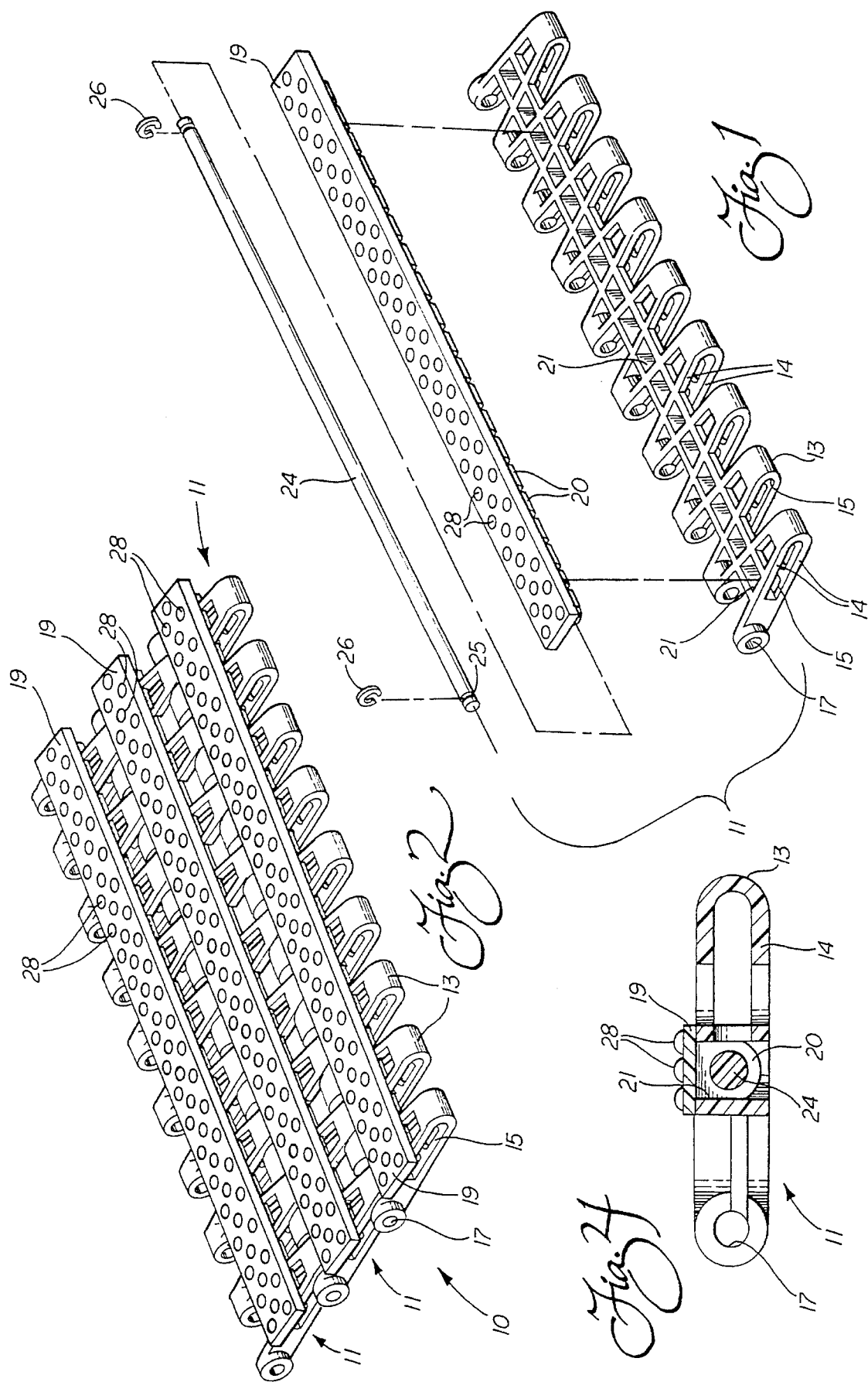

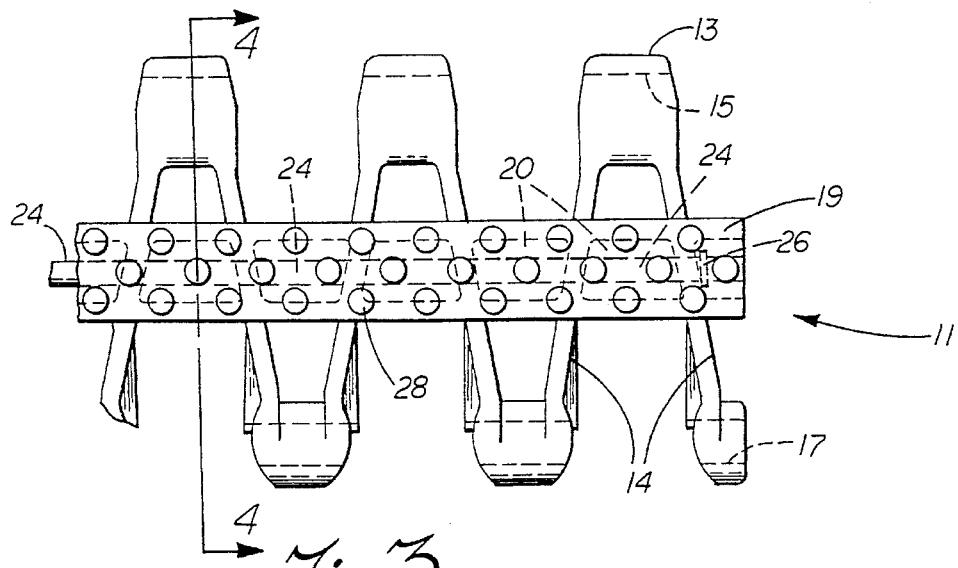
Fig. 3
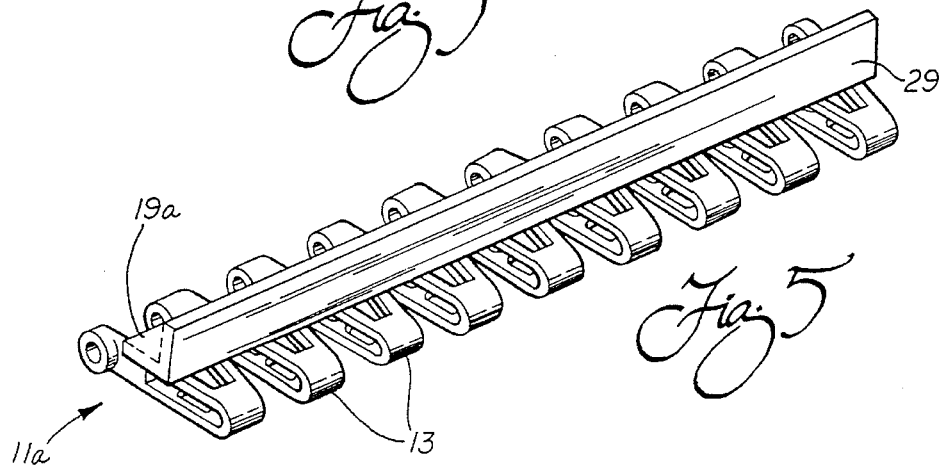
Fig. 5
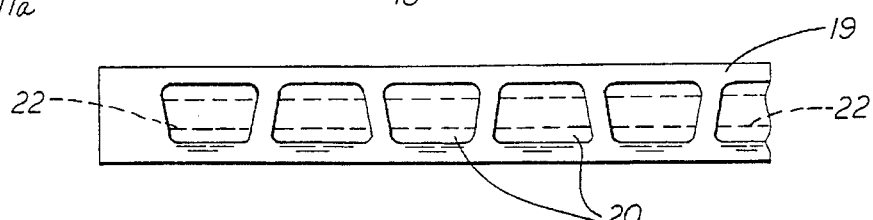
Fig. 6
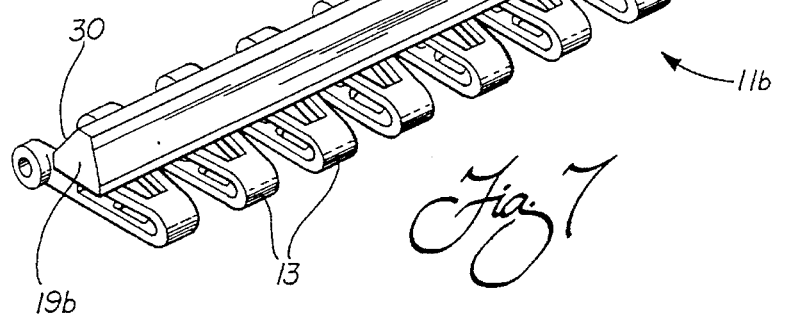
Fig. 7

ARTICLE ENGAGING INSERT FOR MODULAR LINK CONVEYOR

TECHNICAL FIELD

The present invention relates generally to modular conveyors for moving articles or products along a path, and more particularly, to an improvement comprising a single or of a series of removable article engaging inserts.

BACKGROUND OF THE INVENTION

Today, in many modern manufacturing facilities, modular conveyor systems are extensively utilized to transport articles to and from various workstations during all stages of production. In recent years, manufacturers using production lines with conveyors as an integral component of the material handling system, have realized reasonably significant gains in productivity and resource utilization. As a result, modular conveyor systems have become even more widely implemented, and have been adapted to meet an even wider scope of the material handling needs of producers of a multitude of consumer and industrial goods, especially in the processed food industry. Furthermore, adaptation of existing modular conveyors for increased efficiency have become more of a viable alternative to the design of a completely new conveyor system.

However, notwithstanding recent developments and advancements in conveyor design, further improvements in material handling efficiency and conveyor adaptation are desired. For example, some articles requiring conveyor transport often have smooth or slick surfaces. Further, modular conveyors in use today, especially in the food industry, are almost exclusively constructed of rigid plastic links or modules. Such plastic is inherently smooth in surface texture to maintain sanitary requirements. Accordingly, slippage frequently occurs between the transported article and the surface of the conveyor, especially when both the article and conveyor surface are smooth. Understandably, this leads to reduced material handling efficiency whenever such product slippage occurs.

In an effort to minimize product slippage, some prior art modular conveyors have been constructed with at least some links comprising solid elastomeric material, such as rubber. Advantageously, users of such links have realized a reduction in product slippage due to the increased frictional characteristic of the elastomer. However, the use of such elastomer links has proven to have significant shortcomings as well. For example, elastomer is a comparatively weak material, and links composed of elastomer tend to weaken and rapidly wear as they are subjected to the stress and strain associated with movement along the conveyor path. Moreover, when elastomer links are used in a modular conveyor that traverses a curve or bend, the weakening of the links is further hastened. Furthermore, solid elastomer links lack the ability to smoothly interact with each other and the conveyor frame in an efficient, slidable relationship, as is necessary when the conveyor path traverses a bend. Instead, the elastomer links, due to their high frictional quality, necessarily must shift with respect to each other with greater resistance, further contributing to the weakening of the links as well as generally jerky conveyor movement.

Another approach in the prior art, adopted in an effort to improve conveyor belt material handling efficiency, has been to construct some of the modular links to include upstanding protrusions to provide a further degree of driving and positional support for articles placed upon the conveyor. For example, U.S. Pat. No. 4,953,693 to Draebel, owned by the assignee of the present invention, discloses the provision of upstanding fins on the legs of modular conveyor links. The fins are capable of being constructed in a variety of heights for positively engaging articles on the conveyor. Additionally, links with these upstanding fins can be installed in a variety of positions on the conveyor belt so as to create compartments, channels, and the like. Even so, this system of providing projections as a component of the modular links themselves lacks the capability of being adaptable to changing material handling needs. For example, if material handling requirements of a user change in such a way so as to necessitate the transport of differently sized or shaped articles, the whole conveyor belt may have to be restructured or replaced.

Similarly, U.S. Pat. No. 3,602,364 to Maglio et al. discloses a broad teaching of using high friction elements on a belt. Specifically, Maglio teaches the concept of utilizing suction cups to provide additional frictional capability for smooth, flat belt conveyors. Nonetheless, the Maglio system does not teach removable frictional elements that are easily removable, and thus readily selectively positionable on the conveyor where needed. Further, a belt of the Maglio type has the additional limitation of lacking the capability to traverse bends.

The U.S. Pat. No. 4,629,063 to Hodlewsky et al. discloses the utilization of resilient gripping members on a flexible system of dual conveying chains for lifting products from one height to another. However, this system similarly has the limitation of not being readily adaptable to handling differently sized and shaped products. This inflexibility is a result of the fixed distance across which the dual chains are permanently mounted. Thus, although the resilient members may be capable of grasping a limited range of different products, this system is still limited in use to situations where flexible and adaptable material handling is not required.

The U.S. Pat. No. 5,224,583 to Palmaer et al. discloses the concept of providing rolling inserts for modular link conveyors. However, these inserts are designed to add additional stability to the conveyor rather than enhance material handling capabilities.

Thus, it is clear that a need exists for a conveyor with improved material handling capabilities featuring an article engaging insert that is readily positionable on the conveyor where needed. Also, such an insert exhibiting increased frictional properties is desirable. Such a conveyor would be capable of quick adaptation in the field to accommodate the transportation of articles of different sizes, shapes and textures. Such a conveyor would further be able to provide for positive engagement of articles being transported in an economically more efficient, more productive and more reliable manner.

SUMMARY OF THE INVENTION

It is therefore a primary object of the present invention to overcome the above described limitations and disadvantages in the conveyor material handling prior art.

An additional object of the invention is to provide an insert for a modular conveyor providing increased economic and operational efficiency in conveyor material handling.

Still another object of the invention is to provide a reliable and efficient means to especially convey articles with smooth or slick surface textures, either by abutment of the individual article or by increased frictional force, and thus provide with minimal slippage between the conveyor surface and the transported articles.

Another object of the present invention is to provide a means for implementing a high friction conveying surface without the associated resultant reduction in conveyor strength and durability found in the prior art.

Yet another object of the invention is to provide a means for incorporating positive engagement of articles in conveyor material handling that is flexible and adaptable to changing manufacturer needs.

It is still another object of the present invention to provide a means for enhancing the material handling capabilities of existing conveyors through the use of article engaging inserts.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a modular link conveyor with article engaging inserts is provided to effect reliable, efficient, and adjustable means for transporting articles of various shapes, sizes and textures. The invention disclosed can be used in a wide variety of applications and is especially desirable in those production or manufacturing situations where a conveyor must necessarily be adaptable to transport articles of low frictional and/or varying characteristics.

The conveyor belt is generally formed by a plurality of interconnecting modular links. More particularly, such a modular conveyor arrangement is disclosed in, for example, the U.S. Pat. No. 4,953,693 to Draebel, entitled "Modular Link Conveyor System" and assigned to the assignee of the present invention. The disclosure of this patent, as it pertains to the structure of the conveyor belt and modular links, is incorporated herein by reference.

According to another important aspect of this invention, article engaging inserts are provided for use on the modular conveyor belt. Each of these inserts includes a means for retaining the insert on the conveyor. More specifically, each article engaging insert includes at least one downwardly extending projection for insertion in a corresponding aperture between the legs of at least one modular link of the conveyor. The insert projections are ideally shaped in such a way so as to fit flush within the links of the conveyor belt, facilitating a secure fit. Further, these downwardly extending projections of the article engaging insert are provided with at least one transverse opening. A cross rod is placed transversely through the opening of the downwardly extending projection and through a corresponding section of a transverse slot provided adjacent the apex of the conveyor modular links.

The rod is ideally slightly longer than the width of the conveyor in which it is securing an article engaging insert. Accordingly, when the rod is in place, both ends protrude a slight distance. The rod is further provided on both ends with an annular groove about its circumference. In order to lock the rod in position, and to provide for the secure engagement of the article engaging insert with the conveyor, C-clips are snapped into both grooves of the rod upon its installation. Thus, the rod is firmly locked into position.

Advantageously, this retaining means allows for the quick disengagement of the article engaging insert from the conveyor belt by simply removing the C-clips, withdrawing the retaining rods, and lifting the insert from its position on the conveyor. Because of the relative ease with which these inserts can be installed on and removed from the conveyor belt, conveyor systems using such inserts are readily adaptable for the transportation of a variety of different articles of varying sizes, frictional characteristics and shapes. In addition, such inserts are also readily incorporated into existing modular link conveyors, thus availing users of an economically efficient way in which to incorporate the article engaging inserts as a part of their current material handling systems.

In the preferred embodiment, each article engaging insert advantageously includes a high friction section that forms a part of the conveying surface. More specifically, each high friction section of the insert is provided with a plurality of pads fabricated from an elastomer material, such as rubber or some other similar substance. These elastomer pads provide for the positive frictional engagement of articles being transported along the conveyor path.

The implementation of a high friction section as a conveyor insert has several advantages. First, such an arrangement eliminates the problems of rapid structural weakening due to the stress, strain and increased friction between links associated with conveyors composed of elastomer modular links. In addition, the insert system unlike conventional rubber modular link conveyors, has the advantage of being able to traverse bends in a smooth fashion along the conveyor path while providing for the desired frictional engagement of transported articles.

In an alternative embodiment, each article engaging insert includes simply an upstanding pusher bar adapted to extend above the conveying surface. This arrangement is particularly useful when it is necessary to provide articles being conveyed with additional support, such as when the conveyor path is inclined. In addition, these pusher bar inserts may be fashioned in such a manner so as to engage articles in the most advantageous way. For example, a pusher bar provided with an oblique face could be used to positively engage round or spherical articles.

Still other objects of the present invention will become apparent to those skilled in this art from the following description wherein there is shown and described preferred and alternative embodiments of this invention, simply by way of illustration of one of the modes and alternative embodiments best suited to carry out the invention. As it will be realized, the invention is capable of still other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 1 is an exploded perspective view of a single modular link of a conveyor showing a high friction article engaging insert of the preferred embodiment and its corresponding retaining rod;

FIG. 2 is a perspective view of a segment of a modular link conveyor with several modular links with high friction article engaging inserts of the preferred embodiment secured thereon;

FIG. 3 is an enlarged, top plan view of a cut-away section of a link of the conveyor system with the high friction insert of the preferred embodiment in place;

FIG. 4 is a cross-sectional view taken along line 4—4 of FIG. 3;

FIG. 5 is a perspective view of a modular link showing an article engaging insert including a pusher bar as a first alternative embodiment;

FIG. 6 is a plan view of the underside of either article engaging insert, as illustrated; and FIG. 7 is a perspective view of a modular link showing an article engaging insert with an obliquely angled pusher bar as a second alternative embodiment.

Reference will now be made in detail to the present preferred embodiment of the invention, an example of which is illustrated in the accompanying drawings.

DETAILED DESCRIPTION OF THE INVENTION

Reference is made to FIG. 2 illustrating a section of a modular link conveyor 10 made up of several composite links 11 with article engaging inserts 19 of the preferred embodiment in place. As will become apparent by reviewing the description below, the modular link conveyor 10 operating in conjunction with the improvement of a series of the article engaging inserts 19, provides for a smooth conveying surface. As a result, an efficient and flexible manner of providing for positive engagement of articles or products to be transported along the conveying path is obtained.

Each portion of the composite modular links 11 (see FIGS. 1 and 3) includes a tip or apex end 13 and a pair of legs 14 extending at an angle therefrom. A plurality of transverse connectors (not shown) are provided to interconnect and retain the links 11 together, thereby forming the modular link conveyor 10. Specifically, as best shown in FIGS. 1 and 2, the apexes 13 of the links 11 include a transversely oriented slot 15 for receiving the connectors. The distal end of each leg 14 includes a transverse hole 17 for also receiving the connectors. The holes 17 are coaxial such that each connector passes freely through all aligned holes 17 and slots 15. When properly connected, the connectors join the legs 14 of the links 11 in one row with the apexes 13 of the links 11 in the adjacent row forming the interlocking modular conveyor 10. A more detailed disclosure of the foregoing conveyor is described in U.S. Pat. No. 4,953,693 to Draebel, of which the present application is an improvement, and is incorporated herein by reference.

According to an important aspect of this invention, the series of article engaging inserts 19 is provided to improve the material handling efficiency of the modular link conveyor 10 (see FIGS. 1, 2, 5 and 7). As shown in FIGS. 1 and 4, each insert 19 includes at least one downwardly extending projection 20 for insertion in a corresponding aperture 21 between the legs 14 of the modular links 11. As shown in FIG. 6, the shape of the downwardly extending projection 20 is such that it ideally fits flush in the corresponding aperture 21 (cf. FIG. 1). The resulting smooth profile, and flush fit of the modular link conveyor 10 and the inserts 19 minimizes the build up of dirt and debris and facilitates conveyor cleaning. However, any substantially square-shaped projection 20 may similarly serve to place and align the insert 19 on the conveying surface.

As shown in FIG. 1, a separate retaining means is provided to lock the article engaging insert 19 in place on the conveyor 10. A series of openings 22 passes transversely through the downwardly extending projection 20 of the insert 19 (see FIG. 6). To form the retaining means, a cross rod 24 is inserted through the openings 22 and corresponding rear sections of the transverse slots 15 adjacent the apex 13 of the modular links 11. With the rod 24 in place and engaging the legs 14 of the links 11, the inserts 19 are securely locked in position on the conveyor 10 (see FIG. 4).

When installed, each rod 24 extends a short distance from the outside edges of the modular links 11 on both ends of the width of the conveyor 10. C-clips 26 may be easily secured on both protruding ends of the shaft 24 in corresponding annular grooves 25 (see FIG. 1). The C-clips abut against the upper and lower legs 14 forming the slot 15 at each end so that the rod 24, and thus the insert 19 is locked in place. The C-clips 26 and each rod 24 may also be easily removed in a similar fashion.

From the foregoing description, it will be realized that as it becomes necessary to transport articles of various frictional characteristics, sizes and shapes along the conveyor surface, the series of inserts 19 can be rearranged, removed and/or installed to meet the particular current needs. The resulting adaptability and interchangeability of the conveyor inserts 19 contribute to the overall efficiency of the user's manufacturing and/or processing operation. Only minimal time is required for installation and/or removal as these material handling needs change. In addition to being easily changed for production purposes, the inserts 19 may also be quickly removed for cleaning or for conveyor maintenance.

In the preferred embodiment of the present invention, the multiple article engaging inserts 19 may be provided with a high friction means forming an extended conveying surface (see FIG. 1). To this end, each section includes a plurality of elastomer pads 28. FIG. 2 shows the conveying surface comprising three of the article engaging inserts 19 of the preferred embodiment in place.

The elastomer pads 28 of high friction rubber, or the like mounted on the insert 19 thus provides for the positive frictional engagement of articles along the entire conveying surface forming the conveyor path. The insert 19 itself is fabricated from high density plastic, such as polyethylene, for non-resiliency durability and strength. Accordingly, frictional engagement may be realized without resultant material weakness and wear problems associated with prior art methods of providing frictional engagement. Also, by providing for frictional engagement through the insert 19 for the modular link conveyor 10, the present invention, unlike traditional modular conveyors, provides for bend traversing capabilities, while also providing for the desired positive frictional engagement.

In the alternative embodiment as shown in FIG. 5, each article engaging insert 19a on link 11a may include an upstanding pusher bar 29 mounted transversely across the conveyor 10. The pusher bar 29 is best suited for use in those situations where additional positive engagement is required for efficient material handling. For example, a pusher bar 29 might be useful when the conveyor path is inclined. Similarly, an insert 19a of this type could be used for partitioning different groupings of articles being transported.

In another alternative embodiment, the insert 19b on a composite link 11b takes the form of an upstanding pusher wedge with opposed faces 30 at an oblique angle to the conveying surface (see FIG. 7). Such obliquely angled faces 30 on the insert 19b similarly serve to provide additional positive engagement. Such an arrangement would advantageously serve, for example, as a sort of wedge for the more efficient transport of round, spherical or irregularly shaped articles. Other shapes for the inserts 19, 19a and 19b will readily come to mind to persons skilled in the art and thus are within the broader aspects of the present invention.

In summary, numerous benefits have been described which result from employing concepts of the invention. The modular conveyor 10 is capable of exhibiting smooth, continuous operation even when traversing bends. A series of article engaging inserts 19, 19a, 19b with either the high friction pads 28, the upstanding pusher bars 29 or the angled faces 30 to form wedges, advantageously serve to positively engage articles being transported, thus enhancing conveyor efficiency and overall manufacturing or processing productivity.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, in the preferred embodiment of the article engaging insert 19, the high friction section might comprise a surface with a tacky substance applied thereon to effect increased frictional engagement. The preferred embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A modular link conveyor for moving articles along a path, the improvement comprising:
   a plurality of modular links forming a conveying surface including a plurality of laterally disposed repeating links, each of said laterally disposed repeating links further including at least one apex and two legs extending therefrom, said apex further including a slot passing transversely therethrough across substantially the full width of said link, said legs further terminating in a distal end portion, each said end portion including a hole passing transversely therethrough;
   a plurality of transverse connecting means, said connecting means passing through said slots and said holes to engage said modular links together;
   a plurality of substantially rigid, non-resilient article engaging inserts, each said insert including at least one downwardly extending projection for insertion in a corresponding aperture between said legs of said laterally disposed repeating links; and
   retaining means for positively engaging said inserts across substantially the full lateral width of each of said laterally disposed repeating links to securely lock said inserts on said conveyor;
   whereby said inserts can be easily installed or removed on said conveyor for selective engagement with said articles to provide a positive conveying force thereto.

2. The conveyor of claim 1 wherein said retaining means includes at least one opening passing transversely through said projection, a corresponding section of said slot, and a rod extending through said opening and said slot section, whereby said rod engages said legs so as to lock said inserts to said conveyor.

3. The conveyor of claim 1 wherein each said article engaging insert includes spaced-apart high friction elements forming a part of said conveying surface.

4. The conveyor of claim 3 wherein said high friction elements include a plurality of elastomer pads.

5. The conveyor of claim 1 wherein each said article engaging insert includes an upstanding pusher bar adapted to extend above said conveying surface.

6. The conveyor of claim 5 wherein said upstanding bar extends at an oblique angle to said conveying surface.

7. In a modular conveyor for moving at least one article along a path, the improvement comprising:
   a plurality of modular links forming a conveying surface including a plurality of laterally disposed repeating links;
   a substantially rigid, non-resilient article engaging insert; and
   retaining means for positively engaging said insert along substantially the full lateral width of one of said plurality of laterally disposed repeating links to securely lock said insert on said conveyor;
   whereby said insert can be easily removed or installed on said conveyor for selective engagement with said article to provide a positive conveying force thereto.

8. The improvement of claim 7 wherein said article engaging insert includes spaced-apart high friction elements forming a part of said conveying surface.

9. The improvement of claim 7 wherein said high friction element include a plurality of elastomer pads.

10. The improvement of claim 7 wherein said article engaging insert includes an upstanding pusher bar adapted to extend above said conveying surface.

11. The improvement of claim 10 wherein said upstanding bar extends at an oblique angle to said conveying surface.

12. A modular link conveyor for moving articles along a path, the improvement comprising:
   a plurality of modular links forming a conveying surface including a plurality of laterally disposed repeating links;
   a plurality of substantially rigid, article engaging inserts forming a substantially continuous conveying surface; and
   retaining means separate from said laterally disposed repeating links for positively engaging said inserts along substantially the full lateral width of each of said laterally disposed repeating links to securely lock said inserts on said conveyor;
   whereby said inserts can be easily removed or installed on said conveyor for selective engagement with said article to provide a positive conveying force thereto.

13. The improvement of claim 12 wherein each said article engaging insert includes spaced-apart high friction elements forming a part of said conveying surface.

14. The improvement of claim 13 wherein said high friction elements include a plurality of elastomer pads.

15. The improvement of claim 12 wherein each said article engaging insert includes an upstanding pusher bar adapted to extend above said conveying surface.

16. The improvement of claim 15 wherein said upstanding bar extends at an oblique angle to said conveying surface.

17. The conveyor of claim 1 wherein each said article engaging insert includes at least one high friction element forming a part of said conveying surface.

18. The conveyor of claim 17 wherein said high friction element includes at least one elastomer pad.

19. The improvement of claim 7 wherein said article engaging insert includes at least one high friction element forming a part of said conveying surface.

20. The improvement of claim 19 wherein said high friction element includes at least one elastomer pad.

21. The improvement of claim 12 wherein each said article engaging insert is non-resilient.

* * * * *